United States Patent
Oroskar et al.

(10) Patent No.: US 9,843,967 B1
(45) Date of Patent: Dec. 12, 2017

(54) USE OF FALLBACK COVERAGE AREA LOAD TO MANAGE FALLBACK COMMUNICATION SETUP

(71) Applicant: Sprint Spectrum L.P., Overland Park, KS (US)

(72) Inventors: Siddharth S. Oroskar, Overland Park, KS (US); Jose L. Hernandez, Overland Park, KS (US); Ahmad N. Saleh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 722 days.

(21) Appl. No.: 14/057,686

(22) Filed: Oct. 18, 2013

Related U.S. Application Data

(63) Continuation-in-part of application No. 13/947,568, filed on Jul. 22, 2013, now Pat. No. 9,226,210.

(51) Int. Cl.
*H04W 80/04* (2009.01)
*H04W 36/00* (2009.01)
*H04W 48/16* (2009.01)

(52) U.S. Cl.
CPC ....... *H04W 36/0022* (2013.01); *H04W 48/16* (2013.01)

(58) Field of Classification Search
CPC . H04W 36/22; H04W 36/00; H04W 36/0022; H04W 36/14; H04W 36/06; H04W 88/06; H04W 88/08; H04W 24/00; H04W 8/08; H04W 60/00; H04W 4/00
USPC ........ 370/331, 338; 455/436, 443, 438, 434, 455/456.1, 435.2, 515
See application file for complete search history.

(56) References Cited

U.S. PATENT DOCUMENTS

| | | | |
|---|---|---|---|
| 4,916,728 A | 4/1990 | Blair | |
| 5,950,130 A | 9/1999 | Coursey | |
| 6,016,427 A | 1/2000 | Barber et al. | |
| 6,148,197 A | 11/2000 | Bridges et al. | |
| 6,415,148 B1 | 7/2002 | Chiniga et al. | |
| 6,463,298 B1 | 10/2002 | Sorenson et al. | |
| 6,625,451 B1 | 9/2003 | La Medica, Jr. et al. | |
| 7,437,165 B2 | 10/2008 | Burgess et al. | |
| 7,848,758 B1 | 12/2010 | Sill et al. | |
| 8,045,981 B2 | 10/2011 | Umatt et al. | |
| 8,060,133 B1 | 11/2011 | Khanka et al. | |
| 8,081,973 B2 | 12/2011 | Bamburak et al. | |

(Continued)

FOREIGN PATENT DOCUMENTS

WO WO 2013/084720 6/2013

OTHER PUBLICATIONS

U.S. Appl. No. 13/947,568, filed Jul. 22, 2013.

*Primary Examiner* — Andrew Chriss
*Assistant Examiner* — Rasha Fayed

(57) ABSTRACT

Disclosed is a method and system to help manage latency and reduce unnecessary signaling in setup of fallback communications, such as circuit switched fallback calls for instance, by taking into account the load in various fallback coverage areas. When the load of a fallback coverage area is threshold high, signaling may pass to a serving network to cause that fallback coverage area to be filtered out of a list of fallback coverage areas that a base station of the serving network would provide to a served device, so as to help avoid having the device scan for coverage of that fallback coverage area.

19 Claims, 5 Drawing Sheets

(56) References Cited

U.S. PATENT DOCUMENTS

| | | | |
|---|---|---|---|
| 8,270,988 B1* | 9/2012 | Sarkar | H04W 16/04 370/331 |
| 8,320,949 B2 | 11/2012 | Matta | |
| 8,325,648 B1 | 12/2012 | Shah et al. | |
| 8,391,248 B2* | 3/2013 | Ferrato | H04W 16/18 370/253 |
| 8,494,518 B1* | 7/2013 | Shah | H04W 48/16 455/432.3 |
| 2004/0266445 A1 | 12/2004 | Burgess et al. | |
| 2007/0054667 A1* | 3/2007 | Lee | H04L 47/14 455/434 |
| 2007/0077952 A1 | 4/2007 | Sartori et al. | |
| 2007/0142046 A1 | 6/2007 | Welnick | |
| 2009/0080382 A1* | 3/2009 | Chen | H04W 36/0016 370/331 |
| 2009/0098871 A1 | 4/2009 | Gogic | |
| 2010/0150112 A1* | 6/2010 | Lee | H04W 48/16 370/332 |
| 2011/0070880 A1 | 3/2011 | Song et al. | |
| 2011/0098032 A1* | 4/2011 | Lee | H04W 36/0055 455/422.1 |
| 2011/0151877 A1* | 6/2011 | Tafreshi | H04W 36/18 455/442 |
| 2011/0218010 A1* | 9/2011 | Hoymann | H04B 7/024 455/513 |
| 2011/0261777 A1* | 10/2011 | Maeda | H04W 48/20 370/329 |
| 2012/0015650 A1* | 1/2012 | Pudney | H04W 8/08 455/434 |
| 2012/0088539 A1* | 4/2012 | Jeong | H04B 17/0057 455/525 |
| 2013/0064120 A1* | 3/2013 | Bodog | H04W 24/10 370/252 |
| 2013/0065589 A1* | 3/2013 | Lee | H04W 36/0022 455/436 |
| 2013/0279375 A1* | 10/2013 | Newberg | H04W 88/16 370/260 |
| 2016/0135102 A1* | 5/2016 | Gunnarsson | H04W 24/02 455/437 |

\* cited by examiner

USE OF FALLBACK COVERAGE AREA LOAD TO MANAGE FALLBACK COMMUNICATION SETUP

REFERENCE TO RELATED APPLICATION

This is a continuation-in-part of U.S. patent application Ser. No. 13/947,568, the entirety of which is hereby incorporated by reference.

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies with each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

Furthermore, under some air interface protocols, multiple coverage areas throughout a region may operate on the same carrier(s) as each other but communications in each coverage area may be distinguished from communications in nearby coverage areas based on coverage-area identifiers. For instance, in a CDMA network, each sector defined by a base station may have a particular pseudo-noise offset (PN offset) that the base station uses to encode downlink communications in a manner that distinguishes the downlink communications from those in adjacent or otherwise nearby sectors. Similarly, in an LTE network, each cell has a particular physical cell identifier (PCI) that is used to scramble air interface communications and to likewise distinguish communications from those in adjacent or other nearby cells.

On each carrier frequency in a coverage area, the coverage area may also define a number of air interface channels for carrying information between the base station and the WCDs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resources for carrying communication traffic such as voice data and other data between the base station and WCDs.

When a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

OVERVIEW

In systems that provide service under more than one air interface protocol, service providers may implement functionality that allows WCDs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows WCDs to operate by default on LTE and to switch over to operate on the older protocol to engage in voice calls.

Under CSFB, for instance, a hybrid CDMA/LTE WCD may be arranged by default to scan for and register with an LTE network and to operate with its CDMA radio powered off, but to then engage in control signaling with the CDMA network via the LTE network, i.e., over the LTE air interface. To facilitate this, when the WCD registers with the LTE network, LTE network infrastructure such as a mobility management entity (MME) may signal through an inter-working server (IWS) with the CDMA network to register the WCD with the CDMA network as well.

In turn, when the CDMA network has a voice call to connect to the WCD, the CDMA network may signal through the IWS to the LTE network to cause the LTE network to transmit a CSFB page message to the WCD over the LTE air interface. After further CSFB signaling through the LTE network, the WCD may then power on its CDMA radio and tune to the CDMA network to engage in the call over the CDMA air interface.

In one implementation of this process, for instance, once the WCD receives the CSFB page message for the incoming CSFB call, the WCD may transmit a CSFB extended service request message to its serving LTE base station as a request to set up the incoming CSFB call. In turn, the LTE base station may then send to the WCD a list of CDMA coverage areas on which the local CDMA network provides service, possibly specifying for each such coverage area its operating carrier and coverage area identifier (e.g., PN offset). And the WCD may use its CDMA radio to scan for coverage of each of the listed coverage areas and transmit to the LTE base station a report of the strongest CDMA pilot signals and corresponding signal strengths that the WCD detected. The LTE network may then pass those pilot signal measurements via the IWS to the CDMA network, and the CDMA network may use those measurements as a basis to determine a CDMA coverage area and traffic channel to assign to the WCD. The CDMA network may then transmit a handover direction message via the IWS to the LTE network, which the LTE network may transmit to the WCD, directing the WCD to transition to CDMA to communicate in the assigned CDMA coverage area on the assigned traffic channel. The WCD may then use its CDMA radio to tune to the assigned channel and to engage in the call via CDMA.

Likewise, when the WCD is served by the LTE network and has a voice call to place, the WCD may transmit over the LTE air interface to its serving LTE base station a CSFB extended service request message to request setup of an outgoing CSFB call, and the LTE base station may similarly send to the WCD a list of CDMA coverage areas on which the local CDMA network provides service. The WCD may then similarly tune to CDMA and scan for coverage of each of the listed CDMA carriers, and report the strongest detected CDMA pilots to the LTE base station. And the CDMA network may similarly determine a CDMA coverage area and traffic channel to assign to the WCD and transmit a handover direction message via the IWS to the LTE network for transmission to the WCD. The WCD may then similarly use its CDMA radio to tune to the assigned channel and to engage in the call via CDMA.

This CSFB call setup process is generally quite efficient, as it allows the WCD to engage in CDMA voice call setup through its existing LTE connection, without the need for the WCD to be idling in CDMA coverage in the first place.

Unfortunately, however, a problem with this process is that it can take a relatively long time for the WCD to scan for coverage of the local CDMA coverage areas in search of suitable CDMA coverage to report to the LTE network. Furthermore, the CDMA coverage areas that the WCD scans at the direction of the LTE base station may have varying levels of load. For instance, each coverage area may have a different level of traffic channel utilization and/or control channel utilization. If a particular coverage area has threshold high load, such as greater than a threshold extent of channel capacity in use, the CDMA network may decline to assign a channel to the WCD in that coverage area. Thus, having the WCD spend the time to scan such a channel may be unproductive and inefficient, giving rise to unnecessary delay in the CSFB call setup process, and perhaps unnecessary signaling between the networks.

Disclosed herein is a method and system to help manage latency and reduce unnecessary signaling in setup of fallback communications, such as CSFB calls for instance, by taking into account the load in various fallback coverage areas. In accordance with the disclosure, when the load of a fallback coverage area is threshold high, that coverage area will be effectively filtered out of the list of coverage areas that a base station of the serving network would provide to a WCD, so that the WCD may efficiently forgo scanning for coverage of that fallback coverage area.

This could be accomplished in various ways. In one implementation, for instance, each base station of a first network (e.g., LTE) may have a stored CSFB scan-list of local coverage areas of a second, fallback network (e.g., CDMA) that the base station would provide to a served WCD when the WCD is seeking to set up a CSFB call to be served by the second network. Such a scan-list may list coverage area identifiers (e.g., PN offsets or physical cell identifiers) of the local coverage areas of the fallback network, so that the WCD can scan for those particular coverage areas. Further, that CSFB scan-list may differ from base station to base station, considering which second network coverage areas are in the vicinity. When any such coverage area of the second network becomes threshold loaded (i.e., threshold high loaded), the second network may then notify the first network of that fact or may otherwise work with the first network so that the first network would cause each first network base station that has that second network coverage area in its CSFB scan-list to omit the second network coverage area from its CSFB scan-list. That way, if and when any such base station of the first network provides the CSFB scan-list to a WCD to facilitate setup of a CSFB call for the WCD, the list would not include the threshold loaded second network coverage area, so the WCD may avoid unnecessarily scanning for coverage of that coverage area.

In another implementation, this could be done in more real-time when a WCD seeks to place or receive a CSFB call. For example, when a base station of the first network is serving a WCD and the first network engages in a process to facilitate setup of a communication for the WCD to be served by the second network, the first network may work with the second network to determine whether any of the coverage areas of the second network that are listed in the scan-list of the serving base station is threshold loaded. And in response to determining that any such coverage area of the second network is threshold loaded, the serving base station may be made to omit that coverage area from its scan-list. That way again, the scan-list that the serving base station provides to the WCD would exclude the threshold loaded network coverage area, so the WCD may similarly avoid unnecessarily scanning for coverage of that coverage area.

Accordingly, in one respect, disclosed is a method operable in a communication system comprising a first network and a second network. The method comprises determining that a wireless coverage area provided by the second network is threshold loaded. Further, the method comprises, responsive to determining that the wireless coverage area provided by the second network is threshold loaded, causing the first network to omit the wireless coverage area from a scan-list of wireless coverage areas of the second network, where the first network is configured to provide the scan-list to a WCD being served by the first network when the WCD is seeking to transition from being served by the first network to being served by the second network. The method then comprises the first network transmitting the scan-list, excluding the wireless coverage area, to the WCD to cause the WCD to scan for coverage of the second network in accordance with the scan-list.

In another respect, disclosed is a method operable in a communication system comprising an LTE network and a fallback network, where the fallback network provides a plurality of wireless coverage areas, where the LTE network includes a plurality of LTE base stations each having a respective scan-list that indicates respective wireless coverage areas of the fallback network that are in the vicinity of the LTE base station, where each LTE base station is configured to provide its scan-list to a wireless communication device (WCD) served by the LTE base station if and when the WCD is seeking to transition to engage in a circuit switched fallback (CSFB) call served by the fallback network, and where providing the scan-list to the WCD triggers scanning by the WCD for fallback coverage in which to engage in the CSFB call.

In this arrangement, the disclosed method involves receiving into a network entity an indication that a particular wireless coverage area of the fallback network is threshold loaded, and, responsive receiving the indication, the network entity identifying one or more of the LTE base stations that each has the particular wireless coverage area in the scan-list of the LTE base station. Further, the method involves, based on the identifying, signaling to each identified LTE base station to cause the identified LTE base station to omit the particular wireless coverage area from the identified LTE base station's scan-list, so that if and when the identified LTE base station provides its scan-list to a particular WCD to trigger scanning by the particular WCD for fallback coverage, the identified LTE base station would provide to the particular WCD the scan-list excluding the particular wireless coverage area, to help avoid having the particular WCD scan for fallback coverage of the particular wireless coverage area.

In still another respect, disclosed is a communication system including a first network comprising a plurality of first base stations arranged to provide a plurality of first wireless coverage areas and to serve WCDs over a first air interface protocol in the plurality of first wireless coverage areas, a second network comprising a plurality of second base stations arranged to provide a plurality of second wireless coverage areas and to serve WCDs over a second air interface protocol in the plurality of second wireless coverage areas, and an IWS for passing signaling between the first network and the second network. Further, each first base station has a circuit switched fallback (CSFB) scan-list listing a respective plurality of the second wireless coverage areas that are in a vicinity of the first base station, and each first base station is configured to provide its CSFB scan-list to a WCD served by the first base station when the WCD seeks to transition to engage in a CSFB call served by the second network.

In accordance with the disclosure, the IWS is further configured to determine that a particular one of the second wireless coverage areas is threshold loaded and, in response to determining that the particular second wireless coverage area is threshold loaded, to provide to the first network an indication of one or more of the first base stations that each has the particular second wireless coverage area in its CSFB scan-list. Further, the first network is configured to respond to the provided indication by causing at least one of the first base stations to omit from its CSFB scan-list the particular second wireless coverage area, so that if and when the first base station provides its CSFB scan-list to a particular WCD seeking to transition to engage in a CSFB call served by the second network, the CSFB scan-list would exclude the particular second wireless coverage area, to help avoid having the particular WCD scan for coverage of the particular second wireless coverage area.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of a network arrangement in which an exemplary embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
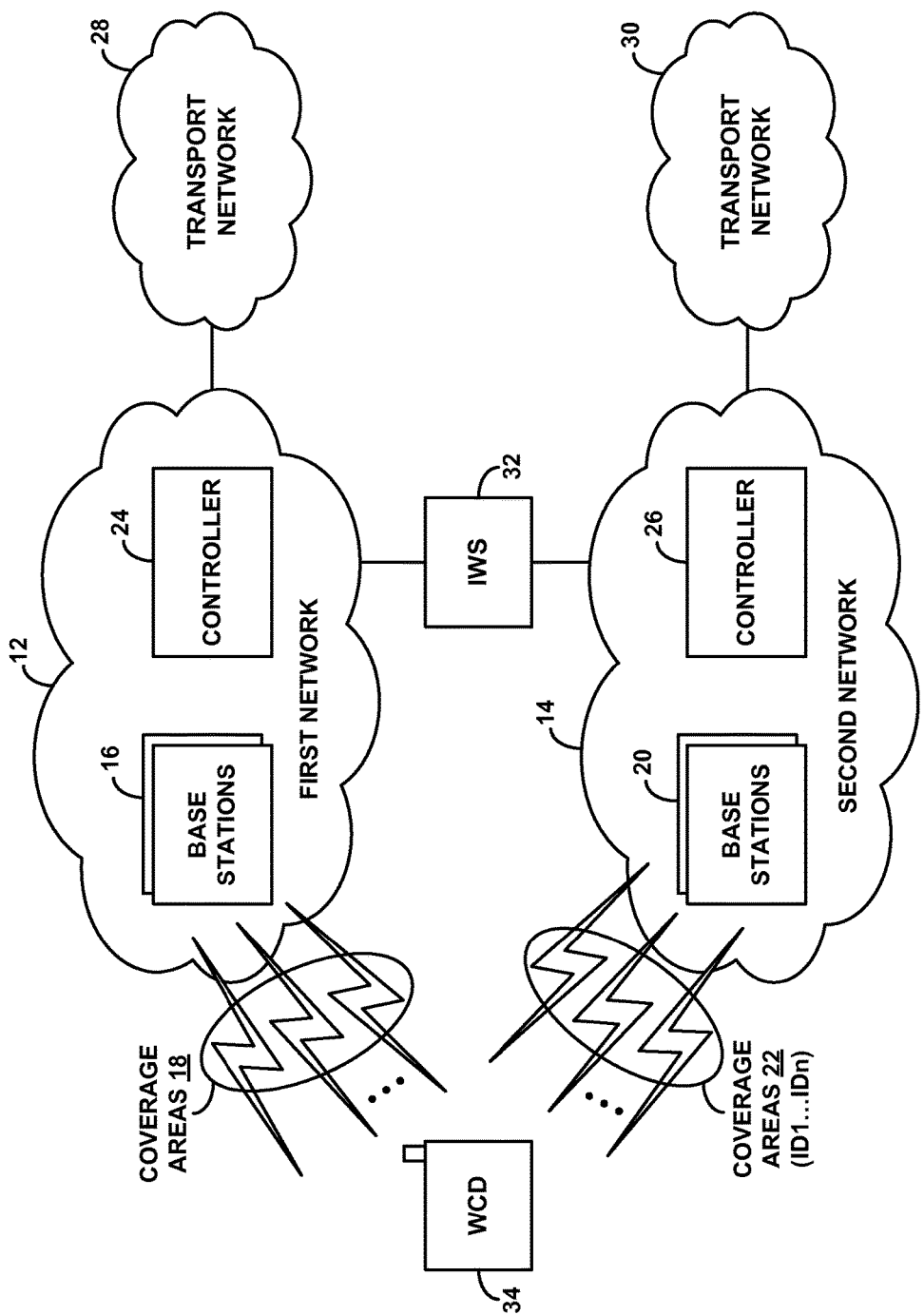
FIG. 1 is a simplified block diagram of a network arrangement in which an exemplary embodiment of the present method and apparatus can be implemented.

The arrangement of FIG. 1 includes by way of example two representative access networks 12, 14, each of which may function to provide WCDs with air interface coverage and connectivity with one or more transport networks such as the PSTN and the Internet. As such, each of these networks may include multiple base stations that radiate to provide one or more respective coverage areas defining an air interface in which to exchange control and bearer data with WCDs. For instance, network 12 includes multiple base stations 16 radiating to provide multiple coverage areas 18, and network 14 includes multiple base stations 20 radiating to provide multiple coverage areas 22. In practice, each base station may provide one or more such coverage areas. Further, as discussed above, each such coverage area may have a respective coverage area identifier, such as a respective PN offset, physical cell identity, or the like. By way of example, the coverage areas 22 provided by base stations 20 of network 14 are shown having respective coverage area identifiers ID1 . . . IDn.

Each network may then further include various network infrastructure to support setup of connections and communications and/or to provide connectivity with transport networks. This network infrastructure may take various forms and may include any of a variety of network elements, such as a controller of one form or another. For instance, in the arrangement shown, network 12 includes a respective controller 24, and network 14 includes a respective controller 26. Network 12 is then shown providing connectivity with a representative transport network 28, and network 14 is shown providing connectivity with a representative transport network 30. In an example implementation, transport network 28 might be the Internet, and transport network 30 might be the PSTN.

As further shown in the figure, an IWS 32 is provided for passing signaling between the first network and the second network. In practice, the IWS may be provided as a function or element of one of the networks in particular. For instance, the IWS may be provided as a function of controller 26 in network 14. The IWS may operate to pass signaling between the controllers 24 and/or other elements of the networks. For instance, in the context of the present disclosure, the IWS may function to pass CSFB call setup messages or similar setup messages between the networks.

Network 12, network 14, and IWS 32 may be owned and operated by a common wireless service provider, and the service provider may configure the networks to interwork with each other (or may arrange for the IWS to associate the networks with each other) so as to facilitate CSFB for instance. Alternatively, the networks may be owned and/or operated by separate wireless service providers, and those service providers may have an agreement with each other to allow for interworking between the networks, again to facilitate CSFB or the like.

With the arrangement shown in FIG. 1, a WCD 34 is shown positioned in coverage of both network 12 and network 14. When such a WCD first powers on or arrives in coverage of network 12, the WCD may scan for and detect coverage provided by network 12 and may responsively register with network 12 by transmitting a registration request via a coverage area 18 to a base station 16. In response, network 12 (e.g., controller 24) may then record the fact that WCD 34 is present within coverage area 18 served by base station 16, so as to facilitate paging WCD 34 for calls or other incoming communications. Further, given the association between network 12 and network 14, network 12 may also responsively signal to IWS 32 to trigger registration of WCD 34 with network 14 as well. WCD 34 may then idle in the coverage area 18 of network 12.

When network 14 has a call or other communication to connect or otherwise provide to WCD 34, network 14 may then send a page message (or page message trigger) to IWS 32, which IWS 32 may pass along to network 12 to trigger paging of the WCD via network 12. Network 12 may then responsively page the WCD by having the serving base station 16 transmit a CSFB page message to the WCD in the coverage area 18. In line with the example CSFB procedures described above, once the WCD responds to this CSFB page, the WCD may then send a CSFB extended service request message to the serving base station 16 to request setup of the CSFB communication. And likewise, when the WCD seeks to place a CSFB call, the WCD may establish connectivity with the serving base station 16 and may send a CSFB extended service request message to the serving base station 16 to request setup of that CSFB communication.

In either case, the serving base station 16 may then transmit to the WCD a CSFB scan-list defining a list of coverage areas of the second network 14, as or with a directive for the WCD to scan for those coverage areas in search of coverage in which to engage in the CSFB communication. In practice, for instance, given the example association between these networks, the serving base station 16 may be provisioned with such a CSFB scan-list listing various coverage areas of the second network 14 that are in the vicinity of the serving base station 16. The list may identify each such second network coverage area by its coverage area identifier and perhaps other information, such as its carrier frequency for instance, and the base station 16 may be configured to transmit the list to a WCD in response receiving a CSFB extended service request message from the WCD. Upon receipt of the scan-list, the WCD may then scan in search of the listed coverage areas and may report one or more strongest detected pilots in a measurement report to the serving base station 16.

Network 12 may then forward to the IWS 32 a representation of the WCD's measurement report, which IWS 32 may in turn provide to an element of network 14, such as controller 26. With that information, network 14 may then select an appropriate coverage area and traffic channel on which to have the WCD engage in the communication, possibly taking load into consideration and perhaps avoiding assignment of a channel in a coverage area that has threshold high load, or, given a choice, preferring assignment of a channel in a coverage area with relatively low load. And the network 14 may return to IWS 32 a handover direction message directing the WCD to transition to that coverage area and channel to engage in the CSFB communication. IWS 32 may then pass that handover direction message to network 12, and the serving base station 16 may transmit the message in the serving coverage area 18 to the WCD. The WCD may then transition to be served by the indicated coverage area and channel of network 14 so as to engage in the CSFB communication.

In accordance with the present disclosure, to help avoid having the WCD spend time scanning for a coverage area of network 14 that has relatively high load, an arrangement is provided for determining that such a coverage area is threshold loaded and for responsively causing each of one or more base stations of network 12 to omit that coverage area from a CSFB scan-list that the base station would provide to WCDs to direct them to scan for CSFB coverage. The serving base station 16 of network 14 may then provide a WCD with a focused, filtered, reduced, or tailored list of coverage areas of network 14 as or with a directive for the WCD to scan for those coverage areas. As such, based on the loading information of coverage areas of network 14, network 12 may avoid directing the WCD to scan one or more threshold loaded coverage areas of network 14, by excluding each such coverage area from the scan-list that the serving base station 16 provides to the WCD.

To facilitate this in an example arrangement, without limitation, the IWS may be provisioned with or otherwise have access to correlation data that indicates for each base station network 12 which wireless coverage areas 22 of network 14 are in the base station's CSFB scan-list. Such correlation data may take various forms. For instance, the correlation data may list each of numerous base stations 16 of network 12 by a base station ID and may correlate each such base station 16 with a set of wireless coverage areas 22 of the network 14 that are included in the CSFB scan-list of the base station 16. Alternatively, the correlation data may list each of numerous coverage areas 22 of network 14 and may correlate each such coverage area 22 with a set of one or more base stations 16 of network 12 that list the coverage area 22 in its CSFB scan-list. And still alternatively, the correlation data may more generally indicate proximity or other relationship between each of various base stations 16 of network 12 and one or more coverage areas 22 of network 14, and/or proximity or other relationship between each of various coverage areas 22 of network 14 and one or more base stations of network 12, so that reference to the data could lead to a determination that a given base station of network 12 has or is likely to have a particular coverage area of network 14 in its CSFB scan-list. Other arrangements are possible as well.

Furthermore, various entities of network 14 may be arranged to report when particular coverage areas 22 of network 14 are threshold loaded. For instance, each base station 20 of network 14 may be configured to monitor load in each of its one or more coverage areas 22 and to report to controller 26 of network 14 when the load in such a coverage area exceeds a defined threshold. Further, controller 26 may be configured to report to IWS 32 that the load in a particular coverage area 22 of network 14 exceeds a defined threshold, perhaps in response to or otherwise based on controller 26 receiving from a base station 20 a report that the coverage area 22 is threshold loaded.

Loading of a coverage area 22 may have various meanings, such as the extent of traffic channel capacity in use, the extent of control capacity in use, and so forth. Thus, for example, a base station 20 of network 14 could determine that a coverage area is threshold loaded by determining that greater than a predefined percentage of available traffic channels or other traffic channel resources in the coverage area are currently assigned or scheduled to be used, by determining that greater than a predefined percentage of control channel timeslots are in use, and/or through consideration of similar metrics. Optimally, the load threshold may be a level of load that might cause network 14 to not assign a traffic channel in the coverage area. As such, the load threshold could be dynamically set based on relative load between coverage areas in network 14, or the load threshold could be statically defined.

In an example implementation of the present disclosure, when a base station 20 of network 14 reports to controller 26 of network 14 the existence of threshold load in a coverage area 22 provided by the base station 20, controller 26 may then responsively report that threshold load condition to IWS 32, specifying the ID of the coverage area 22. IWS may then refer to its correlation data to determine which base stations 16 of network 12 each have that particular coverage area 22 in its CSFB scan-list. In turn, IWS may then report a list or other specification of the determined base station(s) 16 to controller 24 of network 12. And controller 24 may then responsively signal to each specified base station 16 to direct the base station 16 to filter out or otherwise remove the particular coverage area 22 from its CSFB scan-list. Through this proactive process, when the base station 16 thereafter receives a CSFB extended service request message from a WCD seeking to set up a CSFB call to be served by network 14, and the base station 16 responsively provides the WCD with a CSFB scan-list to trigger scanning by the WCD, the scan-list would advantageously exclude the particular coverage area 22.

Alternatively, when a base station 16 of network 12 receives from a WCD a CSFB extended service request message seeking to set up a CSFB call to be served by network 14, and the base station 16 forwards that message to controller 24 and controller 24 forwards the message to IWS 32, IWS may then responsively invoke a process to trigger removal of one or more coverage areas 22 from the scan-list of the serving base station 16 on grounds of threshold load in each such coverage area 22. For instance, the IWS may responsively refer to its correlation data to determine, based on an identifier of the serving base station 16 (as may be indicated in the message or otherwise reported to the IWS), the coverage areas 22 of network 14 that are in the scan-list of that base station 16. The IWS may then signal to controller 26, which may in turn determine from its own records or by signaling with various base stations 20 of network 14 whether any of the determined coverage areas 22 are threshold loaded. And upon thereby determining that such a coverage area 22 is threshold loaded, controller 26 may signal in response to the IWS, and the IWS may signal in response to controller 24. Controller 24 may then responsively signal to the serving base station 16 to direct the base station 16 to filter out or otherwise remove the particular coverage area 22 from its CSFB scan-list. Thus, when the serving base station 16 provides the WCD with the scan-list in response to the WCD's CSFB extended service request message, the scan-list would likewise exclude the particular coverage area 22.

Figure 2:
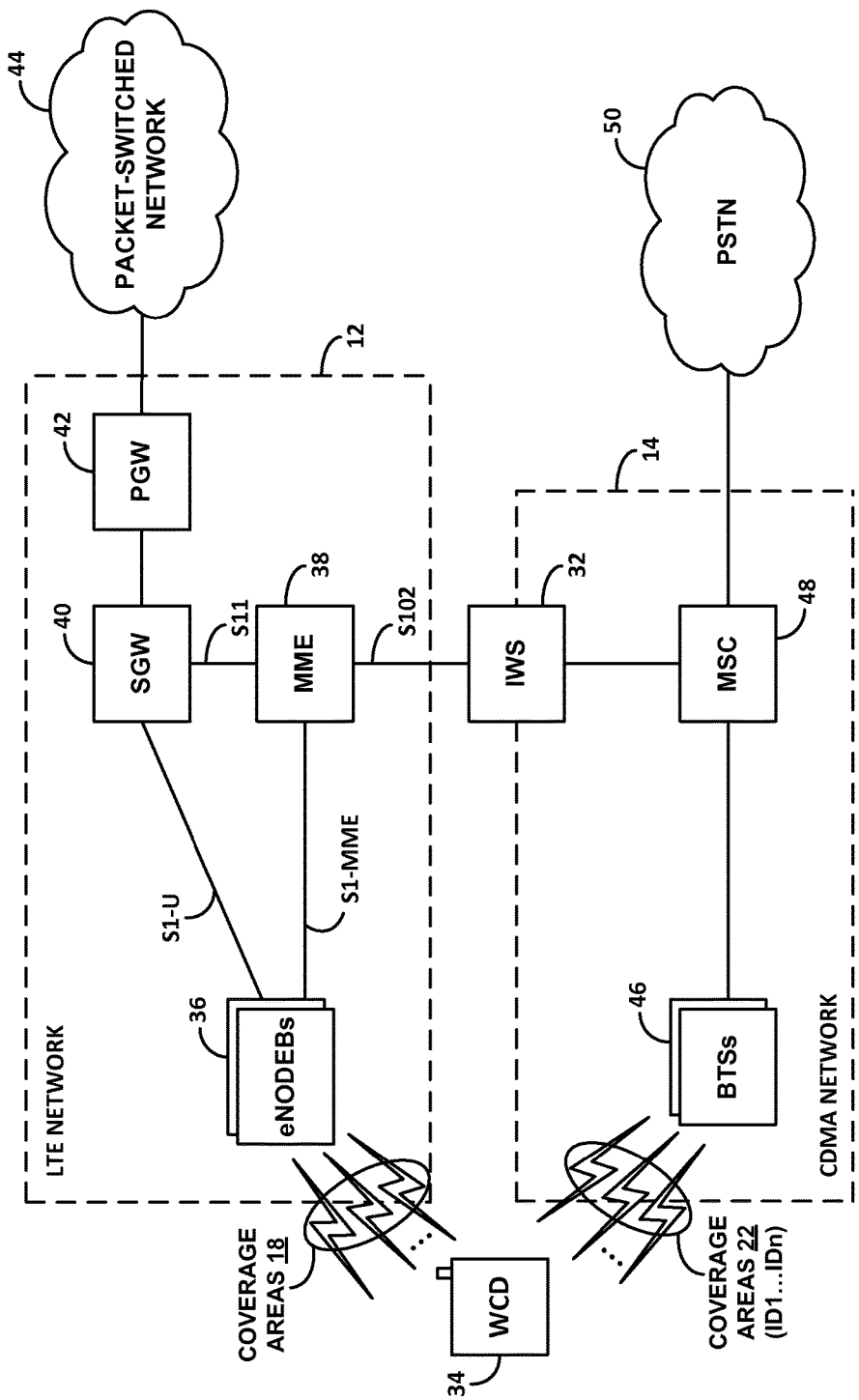
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves WCDs with wireless packet data communication service (including perhaps voice-over-packet and other packet-based real-time media service), and network 14 is a CDMA network that primarily serves WCDs with circuit-switched voice call service (but may also provide packet-data communication service and other types of service). These networks could take other forms as well, using other protocols such as WiMAX, GSM, or others now known or later developed.

The LTE network 12 in this arrangement is shown including representative LTE base stations 36 known as eNodeBs, each of which includes an antenna structure and associated equipment for engaging in LTE communication over an air interface of a respective coverage area 18 with WCDs. The eNodeBs 36 are then shown coupled with an MME 38 that serves as controller 24 and particularly as a signaling controller for the LTE network. Further, the eNodeBs 36 are also shown coupled with a serving gateway (SGW) 40, which may then be coupled with a packet-gateway (PGW) 42 that connects with a packet-switched network 44. And the MME 38 is shown coupled with the SGW 40. Although the elements of the LTE network 12 are shown with direct connections between them, the elements may sit as nodes on a core packet network, and thus the illustrated connections may be logical interfaces between the elements over that network.

The CDMA network 14, on the other hand, is shown including representative CDMA base stations 46 known as base transceiver stations (BTSs), each of which includes an antenna structure and associated equipment for engaging in CDMA communication over an air interface of a respective coverage area 22 with WCDs. The BTSs 46 are then shown in communication (possibly through a base station controller (BSC) or radio network controller (RNC) (not shown)) with a mobile switching center (MSC) 48 that serves as controller 26 to manage paging over the CDMA air interface and that provides connectivity with the PSTN 50.

Further shown in FIG. 2 is then the IWS 32, which functions to facilitate interworking between the LTE network 12 and the CDMA network 14 as discussed above, so as to facilitate CSFB functionality for instance and to facilitate various specific features of the present disclosure.

In practice with this LTE/CDMA arrangement, each LTE eNodeB 36 may broadcast an overhead signal such as a System Information Block #8 (SIB8) that includes data that a recipient WCD may programmatically interpret to mean that the LTE coverage area in which the overhead signal is broadcast is one that supports CSFB functionality. The WCD may then detect this broadcast signal and responsively register in coverage area 18 with the LTE network. Under LTE principles, the WCD may do so by transmitting an attach request to the eNodeB 36, including in the attach request data that indicates capabilities of the WCD and particularly an indication that the WCD supports CSFB functionality.

Upon receipt of this attach request, the LTE network may register presence of the WCD in the coverage area 18 of the eNodeB 36. For instance, eNodeB 30 may signal to MME 38 to trigger this registration. Further, in response to the attach request indicting that the WCD supports CSFB functionality, MME 38 may also signal to IWS 32 to trigger registration of the WCD with the CDMA network 14. In particular upon receipt of the signal from MME 38, IWS 32 may signal to MSC 48, and the MSC (in cooperation with a home location register and/or other network infrastructure) may register the fact that the WCD is currently served by the LTE network 12.

When the MSC 48 receives a request to connect a call to the WCD, the MSC may then send to the IWS 32 a page request, and the IWS may in turn signal to the MME 38. The MME may then signal to the serving eNodeB 36 to trigger paging of the WCD over the LTE air interface. And the serving eNodeB 36 may transmit a CSFB page to the WCD, and the WCD may transmit to the serving eNodeB a CSFB extended service request message, which the eNodeB may forward to the MME. Likewise, if the WCD seeks to originate a CSFB call, the WCD may establish connectivity with the serving eNodeB if necessary and may then send a CSFB extended service request message to the eNodeB, which the eNodeB may similarly forward to the MME.

In accordance with the disclosure, a CDMA BTS 46 may detect that a particular coverage area 22 that it provides has threshold load, and the BTS may responsively notify the MSC 48, which may in turn responsively notify the IWS 32. The IWS may then refer to its correlation data to determine which LTE eNodeBs have that particular coverage area 22 in its CSFB scan-list and may signal to the MME 38 indicating the determined eNodeBs. The MME may then in turn signal to each determined eNodeB to cause the eNodeB to omit the particular coverage area 22 from its scan-list. That way, if and when the eNodeB then receives a CSFB extended service request message from a WCD, the eNodeB may provide the WCD with the scan-list excluding that particular coverage area 22, to help avoid having the WCD scan for coverage of that coverage area 22.

Alternatively, if and when a serving eNodeB receives a CSFB extended service request message from the WCD and the message propagates to the IWS 32, the IWS may determine from its correlation data which coverage areas 22 are in the serving eNodeB's scan-list and may engage in signaling with the MSC as discussed above and thereby determine that a particular coverage area 22 is threshold loaded. The IWS may then similarly signal to the MME indicating the coverage area 22, and the MME may responsively signal to the serving eNodeB to cause the eNodeB to omit that particular coverage area 22 from scan-list. As the eNodeB then provides the WCD with the scan-list in response to the WCD's CSFB extended service request message, the scan-list would again advantageously exclude the particular coverage area 22, to help avoid having the WCD scan for coverage of that coverage area 22. Further, the eNodeB may maintain the scan-list in this modified form for use with respect to other CSFB call setup as well.

In a scenario where a particular coverage area 22 has been removed from an eNodeB's scan-list on grounds of threshold load of the coverage area 22, an additional process may be applied to restore inclusion of the coverage area 22 to the scan-list when appropriate or perhaps after expiration of a predefined time period. For instance, once loading in the coverage area 22 falls below the threshold, the BTS may notify the MSC of that fact, and the MSC may signal to the IWS. The IWS may then determine which eNodeBs have that coverage area 22 in their scan-lists and may signal to the MME, and the MME may signal to each such eNodeB to cause the eNodeB to un-filter or otherwise add the coverage area 22 back into the eNodeB's scan-list.

Figure 3:
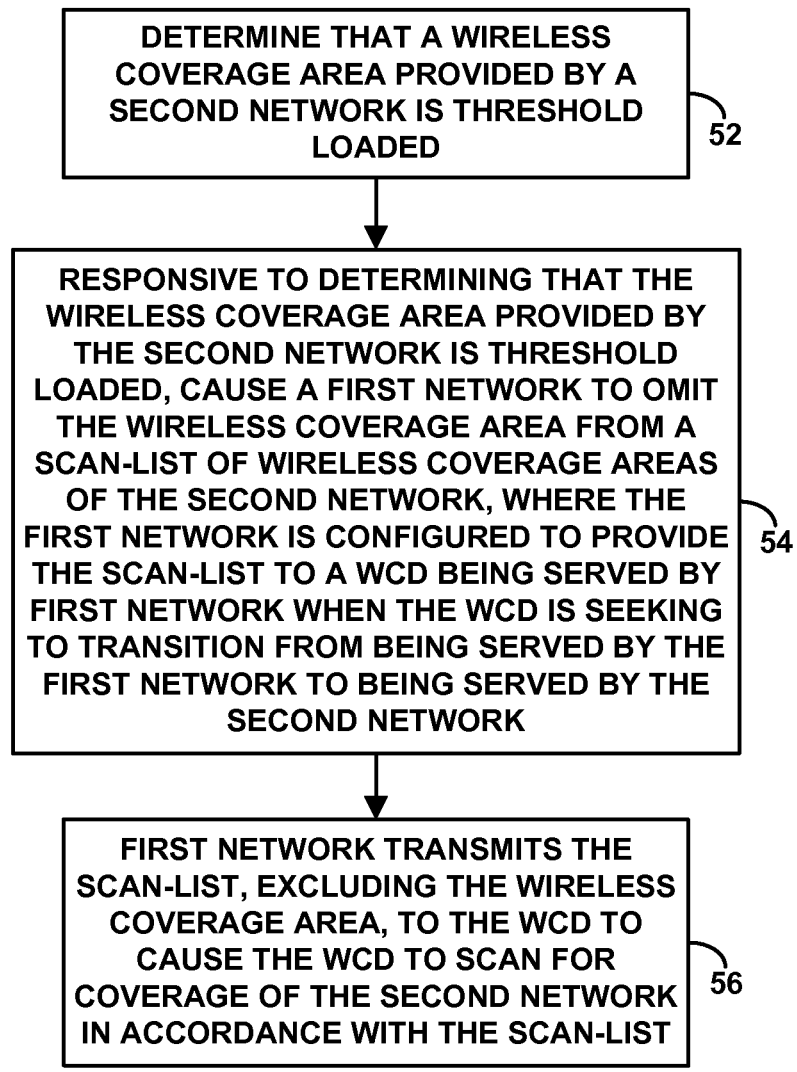
FIG. 3 is a flow chart depicting functions that can be carried out in accordance with an example method.

FIG. 3 is next a flow chart depicting a method that can be carried out in accordance with the present disclosure, in a communication system such as that depicted in FIG. 1 or more specifically in FIG. 2 for instance, and that can thus be implemented by one or more of the illustrated network elements as discussed above.

As shown in FIG. 3, at block 52, the method involves determining that a wireless coverage area provided by network 14 is threshold loaded. At block 54, the method then involves, responsive to determining that the wireless coverage area provided by network 14 is threshold loaded, causing network 12 to omit the wireless coverage area from a scan-list of wireless coverage areas of network 14, where network 12 is configured to provide the scan-list to a WCD being served by network 12 when the WCD is seeking to transition from being served by network 12 to being served by network 14. At block 56, the method then involves network 12 transmitting the scan-list, excluding the wireless coverage area, to the WCD to cause the WCD to scan for coverage of network 14 in accordance with the scan-list.

In line with the discussion above, this method can be carried out in response to signaling indicating that the WCD is seeking to transition from being served by the network 12 to being served by network 14. For instance, the signaling could be a fallback communication setup request seeking setup of fallback communication, such as a CSFB extended service request message seeking setup of a CSFB call. Alternatively, the method could be carried out in advance of the WCD seeking to transition from being served by network 12 to being served by network 14, so that the scan-list would be updated proactively.

Further in line with the discussion above, a base station of the second network 14 may provide the wireless coverage area, and the act of determining that the wireless coverage area provided by network 14 is threshold loaded may involve receiving into a network entity a signaling message generated as a result of the base station of the second network detecting that the wireless coverage area is threshold loaded. For instance, this may involve controller 26 and/or IWS 32 receiving such a signaling message as discussed above.

Figure 4:
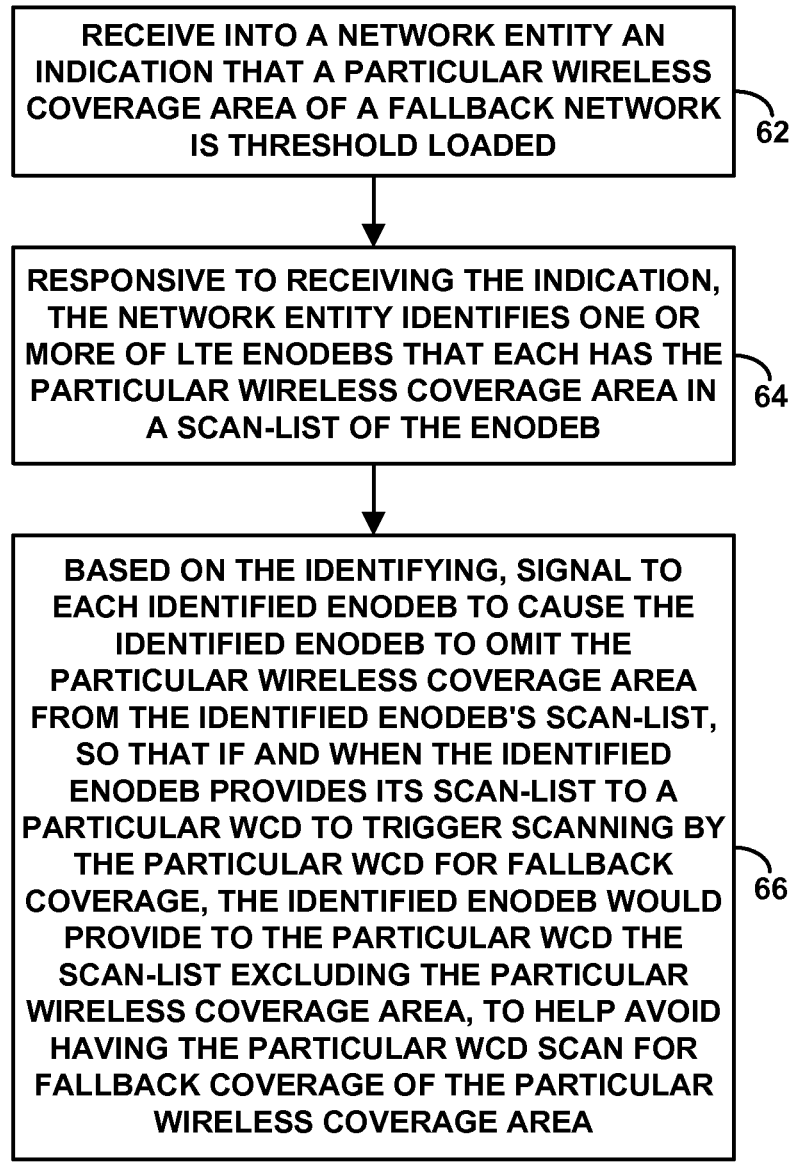
FIG. 4 is another flow chart depicting functions that can be carried out in accordance with an example method.

FIG. 4 is next another flow chart depicting a method that can be carried out in accordance with the present disclosure, in a communication system such as that depicted in FIG. 2 for instance, and that can thus be implemented by one or more of the illustrated network elements as discussed above.

As shown in FIG. 4, at block 62, the method involves receiving into a network entity an indication that a particular wireless coverage area of the fallback network is threshold loaded. At block 64, the method then involves, responsive to receiving the indication, the network entity identifying one or more of the LTE eNodeBs that each has the particular wireless coverage area in the scan-list of the eNodeB. And at block 66, the method involves, based on the identifying, signaling to each identified eNodeB to cause the identified eNodeB to omit the particular wireless coverage area from the identified eNodeB's scan-list, so that if and when the identified eNodeB provides its scan-list to a particular WCD to trigger scanning by the particular WCD for fallback coverage, the identified eNodeB would provide to the particular WCD the scan-list excluding the particular wireless coverage area, to help avoid having the particular WCD scan for fallback coverage of the particular wireless coverage area.

Again in line with the discussion above, a base station of the fallback network may provide the particular wireless coverage area of the fallback network, and the network entity may be an IWS that facilitates signaling between the LTE network and the fallback network. The act of receiving into the network entity the indication that the particular wireless coverage area of the fallback network is threshold loaded may then involve receiving the indication based on a report provided by the base station of the fallback network.

Figure 5:
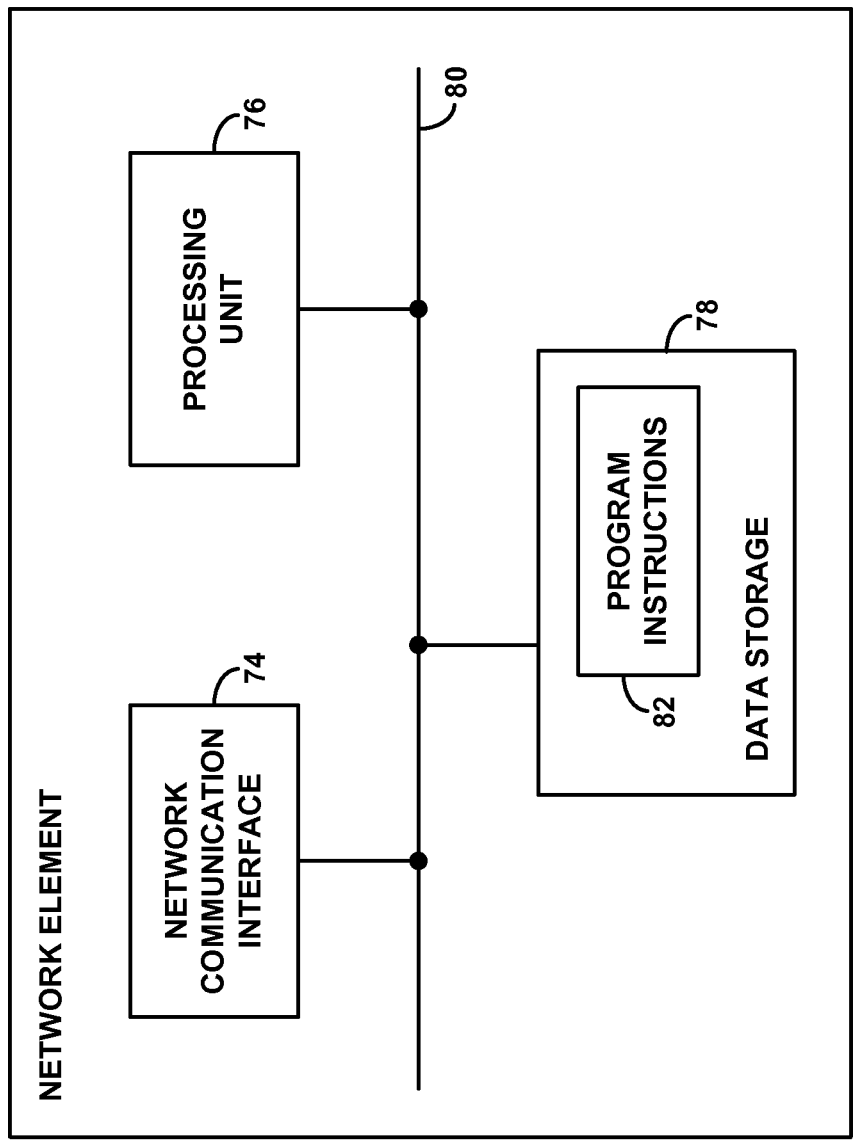
FIG. 5 is a simplified block diagram of a network element operable in a network arrangement such as that depicted in FIGS. 1 and 2.

Finally, FIG. 5 is a simplified block diagram of a network element showing some of the physical components that such an element may include. This block diagram may represent any of a variety of the network elements shown in FIGS. 1 and 2 for instance.

As shown in FIG. 5, the network element includes a network communication interface 74, a processing unit 76, and data storage 78, all of which may be communicatively linked together by a system bus, network, or other connection mechanism 80. With this arrangement, the network communication interface may function to provide for communication with various other network elements and may thus take various forms, allowing for wired and/or wireless communication for instance. Processing unit may then comprise one or more general purpose processors (e.g., microprocessors) and/or one or more special purpose processors (e.g., application specific integrated circuits) and may be integrated in whole or in part with the network communication interface. And data storage 78 may comprise one or more volatile and/or non-volatile storage components, such as optical, magnetic, or flash memory and may be integrated in whole or in part with the processing unit. As shown, by way of example, data storage 78 may then comprise program instructions 82, which may be executable by processing unit 74 to carry out various functions described herein.

Exemplary embodiments have been described above. Those skilled in the art will understand, however, that changes and modifications may be made to these embodiments without departing from the true scope and spirit of the invention.

We claim:

1. In a communication system comprising a first network and a second network, a method comprising:
   determining that a wireless coverage area provided by the second network is threshold loaded; and
   responsive to determining that the wireless coverage area provided by the second network is threshold loaded, causing the first network to omit the wireless coverage area from a scan-list of wireless coverage areas of the second network, wherein the first network is configured to provide the scan-list to a wireless communication device (WCD) being served by the first network when the WCD is seeking to transition from being served by the first network to being served by the second network;
   the first network then transmitting the scan-list, excluding the wireless coverage area, to the WCD to cause the WCD to scan for coverage of the second network in accordance with the scan-list;
   after transmitting the scan-list to the WCD, receiving into the first network from the WCD a measurement report indicating coverage that the WCD has detected from scanning in accordance with the scan-list;
   forwarding from the first network to the second network a representation of the measurement report;
   receiving from the second network into the first network a traffic channel assignment message assigning to the WCD a traffic channel in the second network selected based at least in part on the received measurement report; and
   transmitting the traffic channel assignment message from the first network to the WCD,
   whereby the WCD then transitions to be served by the second network and to engage in communication on the assigned traffic channel.

2. The method of claim 1, wherein the first network includes a plurality of base stations each having a respective scan-list listing wireless coverage areas of the second network that are in a vicinity of the base station, and wherein causing the first network to omit the wireless coverage area from the scan-list comprises:
   determining that the respective scan-list of a given base station of the first network includes the wireless coverage area; and
   responsive to determining that the respective scan-list of the given base station includes the wireless coverage area, signaling to the given base station to cause the given base station to omit the wireless coverage area from its respective scan-list.

3. The method of claim 2, further comprising:
   maintaining correlation data that indicates for each base station of the first network the base station's respective scan-list,
   wherein determining that the respective scan-list of the given base station of the first network includes the wireless coverage area is done by reference to the correlation data.

4. The method of claim 3, wherein the communication system includes an interworking server (IWS) for passing signaling between the first network and the second network, and wherein determining that the scan-list of the given base station of the first network includes the wireless coverage area comprises the IWS determining that the scan-list of the given base station of the first network includes the wireless coverage area.

5. The method of claim 4, wherein maintaining the correlation data comprises the IWS maintaining the correlation data.

6. The method of claim 1, wherein the method is carried out in response to signaling indicating that the WCD is seeking to transition from being served by the first network to being served by the second network.

7. The method of claim 6, wherein the signaling is a fallback communication setup request, seeking setup of fallback communication.

8. The method of claim 7, wherein the first network is a Long Term Evolution (LTE) network, wherein the fallback communication is a circuit switched fallback (CSFB) communication, and wherein the fallback communication setup request message is a CSFB extended service request message.

9. The method of claim 8, wherein the second network is selected from the group consisting of a Code Division Multiple Access (CDMA) network and a Global System for Mobile Communications (GSM) network.

10. The method of claim 1, wherein the method is carried out in advance of the WCD seeking to transition from being served by the first network to being served by the second network, so that the scan-list is updated proactively.

11. The method of claim 1, wherein a base station of the second network provides the wireless coverage area, and wherein determining that the wireless coverage area provided by the second network is threshold loaded comprises:
receiving into a network entity a signaling message generated as a result of the base station of the second network detecting that the wireless coverage area is threshold loaded.

12. The method of claim 1, wherein the wireless coverage area operates on a particular carrier frequency and has a particular wireless coverage area identifier.

13. In a communication system comprising a Long Term Evolution (LTE) network and a fallback network, wherein the fallback network provides a plurality of wireless coverage areas, and wherein the LTE network includes a plurality of LTE base stations each having a respective scan-list that indicates respective wireless coverage areas of the fallback network that are in the vicinity of the LTE base station, wherein each LTE base station is configured to provide its scan-list to a wireless communication device (WCD) served by the LTE base station if and when the WCD is seeking to transition to engage in a circuit switched fallback (CSFB) call served by the fallback network, wherein providing the scan-list to the WCD triggers scanning by the WCD for fallback coverage in which to engage in the CSFB call, a method comprising:
receiving into a network entity an indication that a particular wireless coverage area of the fallback network is threshold loaded;
responsive to receiving the indication, identifying by the network entity one or more of the LTE base stations that each has the particular wireless coverage area in the scan-list of the LTE base station; and
based on the identifying, signaling to each identified LTE base station to cause the identified LTE base station to omit the particular wireless coverage area from the identified LTE base station's scan-list, so that if and when the identified LTE base station provides its scan-list to a particular WCD to trigger scanning by the particular WCD for fallback coverage, the identified LTE base station would (i) provide to the particular WCD the scan-list excluding the particular wireless coverage area, to help avoid having the particular WCD scan for fallback coverage of the particular wireless coverage area, (ii) receive from the WCD a measurement report indicating coverage that the WCD has detected from scanning in accordance with the scan-list, (iii) forward for receipt by the second network a representation of the measurement report, (iv) receive a traffic channel assignment message provided by the second network, assigning to the WCD a traffic channel in the second network selected based at least in part on the received measurement report, and (v) transmit the traffic channel assignment message to the WCD.

14. The method of claim 13,
wherein a base station of the fallback network provides the particular wireless coverage area of the fallback network,
wherein the network entity is an interworking server (IWS) that facilitates signaling between the LTE network and the fallback network, and
wherein receiving into the network entity the indication that the particular wireless coverage area of the fallback network is threshold loaded comprises receiving the indication based on a report provided by the base station of the fallback network.

15. The method of claim 14, further comprising:
responsive to the identifying, passing from the IWS to a mobility management entity (MME) of the LTE network a specification of each identified LTE base station,
wherein signaling to each identified LTE base station comprises signaling from the MME to each identified LTE base station.

16. The method of claim 13, wherein the fallback network is selected from the group consisting of a Code Division Multiple Access (CDMA) network and a Global System for Mobile Communications (GSM) network.

17. A communication system comprising:
a first network comprising a plurality of first base stations arranged to provide a plurality of first wireless coverage areas and to serve wireless communication devices (WCDs) over a first air interface protocol in the plurality of first wireless coverage areas;
a second network comprising a plurality of second base stations arranged to provide a plurality of second wireless coverage areas and to serve WCDs over a second air interface protocol in the plurality of second wireless coverage areas; and
an interworking server (IWS) for passing signaling between the first network and the second network,
wherein each first base station has a circuit switched fallback (CSFB) scan-list listing a respective plurality of the second wireless coverage areas that are in a vicinity of the first base station, and each first base station is configured to provide its CSFB scan-list to a WCD served by the first base station when the WCD seeks to transition to engage in a CSFB call served by the second network,
wherein the IWS is configured to determine that a particular one of the second wireless coverage areas is threshold loaded and, in response to determining that the particular second wireless coverage area is threshold loaded, to provide to the first network an indication of one or more of the first base stations that each has the particular second wireless coverage area in its CSFB scan-list, and wherein the first network is configured to respond to the provided indication by causing at least one of the first base stations to omit from its CSFB scan-list the particular second wireless coverage area, so that if and when the first base station provides its CSFB scan-list to a particular WCD seeking to transition to engage in a CSFB call served by the second network, the CSFB scan-list would exclude the particular second wireless coverage area, to help avoid having the particular WCD scan for coverage of the particular second wireless coverage area, wherein after the first base station provides its CSFB scan-list to the particular WCD, the first base station would (i) receive from the WCD a measurement report indicating coverage that the WCD has detected from scanning in accordance with the scan-list, (ii) forward for receipt by the second network a representation of the measurement report, (iii) receive a traffic channel assignment message provided by the second network, assigning to the WCD a traffic channel in the second network selected based at least in part on the received measurement report, and (iv) transmit the traffic channel assignment message to the WCD.

18. The communication system of claim 17, wherein the IWS stores data that indicates, respectively for each first base station, which second wireless coverage areas are in the first base station's CSFB scan-list, and wherein the IWS is configured to refer to the data to determine the one or more first base stations that has the particular second wireless coverage area in its CSFB scan-list.

19. The communication system of claim 17, wherein the first network is a Long Term Evolution (LTE) network, and wherein the second network is selected from the group consisting of a Code Division Multiple Access (CDMA) network and a Global System for Mobile Communications (GSM) network.

* * * * *